United States Patent [19]

Gijsbers

[11] 4,114,815

[45] Sep. 19, 1978

[54] APPARATUS FOR CONNINUTING SOLIDS IN LIQUIDS

[75] Inventor: Roelof Gijsbers, Rozendaal, Netherlands

[73] Assignee: C. van der Lely N.V., Maaslano, Netherlands

[21] Appl. No.: 727,808

[22] Filed: Sep. 29, 1976

[30] Foreign Application Priority Data

Sep. 29, 1975 [NL] Netherlands ........................ 7511421

[51] Int. Cl.² ............................................. B02C 23/38
[52] U.S. Cl. .................................. 241/45; 241/46.17; 241/88.1
[58] Field of Search .................... 241/43, 44, 45, 46 A, 241/46.11, 46.17, 82.5, 88.1

[56] References Cited

U.S. PATENT DOCUMENTS

| 309,381 | 12/1884 | Dollman | 241/82.5 |
|---|---|---|---|
| 431,230 | 7/1890 | Leopold | 241/82.5 |
| 1,021,000 | 3/1912 | Mitchell | 241/82.5 |
| 3,323,650 | 6/1967 | Kilbane, Jr. | 241/46.17 |
| 3,361,369 | 1/1968 | Ruble | 241/46.17 |

*Primary Examiner*—Granville Y. Custer, Jr.
*Attorney, Agent, or Firm*—Mason, Mason & Albright

[57] ABSTRACT

A homogenizing mechanism for a manure slurry in combination with a supply container and blades adapted to penetrate about fifteen centimeters under the soil surface for injecting manure into the soil by an injection pipe carried by the blade. The mechanism is disposed between container and the injection outlet so that the injected slurry must pass therethrough. An air displacement pump selectively places the container under pressure (up to about one atmosphere) or vacuum for moving the slurry out of or into the container, respectively. The homogenizing mechanism has a substantially cylindrical casing with an inlet from the container on one end and an outlet leading to the injector at the other end. The inlet may be a conduit or an open end of a casing mounted in part within the container. A disc-shaped counterblade with openings is secured within the casing between the inlet and outlet and an oval blade is rotated against the counterblade in a self-sharpening action cutting lumps and solids within the slurry as drawn through the openings in the counterblade. A precutter similar to the oval blade may be placed on the same shaft which is selectively or resiliently positioned to act on slurry as it enters the casing. A shaft rotating the oval blade or blades may also extend through the container for agitating the slurry therein. The container may be on a vehicle or towed trailer with the injection blades adapted to be pivoted to a position under the soil for operation and above the ground for transport. The homogenizing mechanism may also be positioned to treat slurry drawn into the container.

27 Claims, 8 Drawing Figures

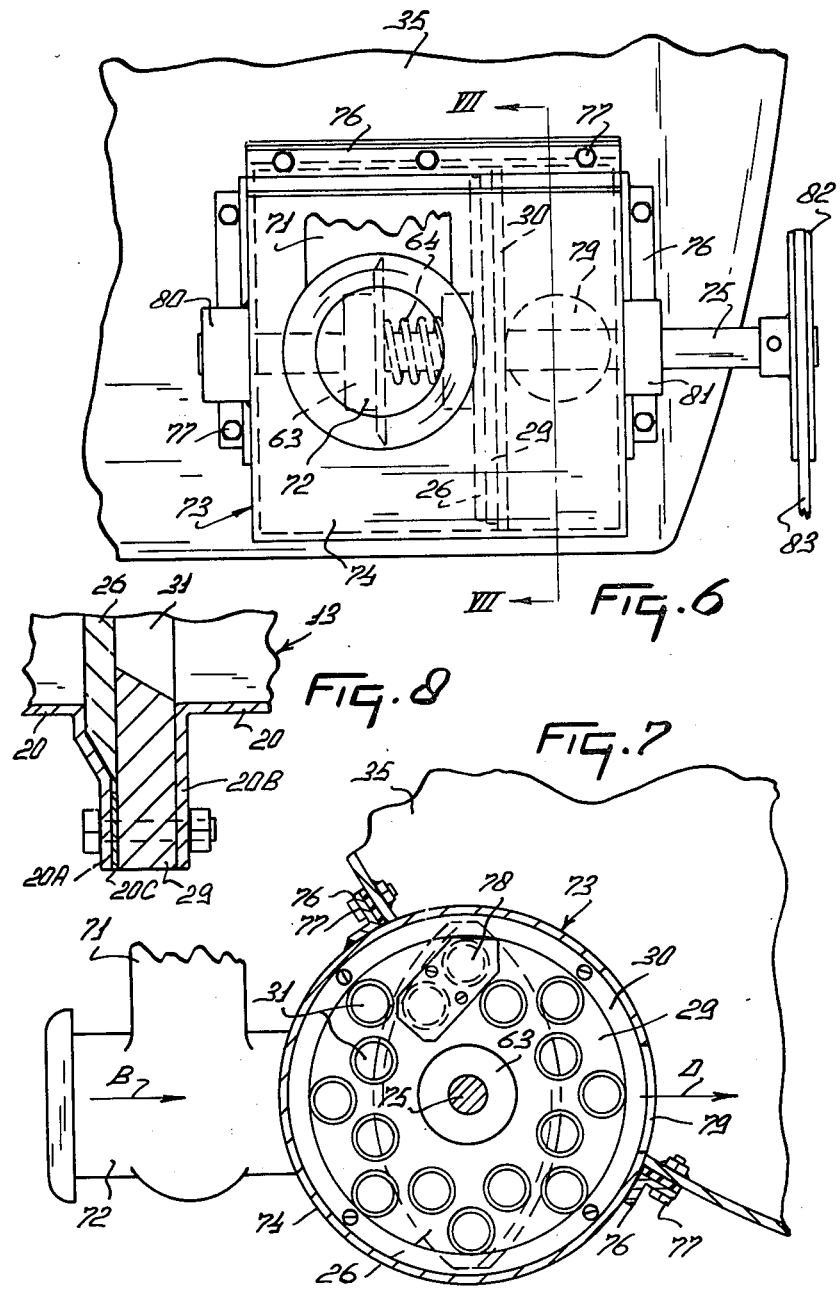

APPARATUS FOR CONNINUTING SOLIDS IN LIQUIDS

SUMMARY OF THE INVENTION

This invention relates to implements for distributing liquids containing undissolved solids, such as organic manure slurry and other organic manure mixtures, into and/or onto the soil, such implements being of the kind comprising a container for the liquid and means for distributing it under pressure.

According to one aspect of the invention, there is provided an implement of the kind set forth, wherein a cutting mechanism for treating the solid constituents of a liquid to be distributed by the implement is provided, the mechanism being at least partially enclosed by a casing and comprising a cutter arranged to cooperate movably with an apertured counter blade, and wherein the movable cutter extends from a fastening region thereof to a location close to the inner surface of said casing and co-operates throughout at least a greater part of its length between said fastening region and said location with the holes in the counter blade, the means for distributing the liquid under pressure being constructed and arranged to force the liquid through the cutting mechanism by producing a pressure difference between inlet and outlet sides of that mechanism when the implement is in operation.

For a better understanding of the invention, and to show how the same may be carried into effect, reference will now be made, by way of example, to the accompanying drawings, in which:

BRIEF DESCRIPTION OF THE DRAWINGS

FIG. 6 is a elevation, to the same scale as FIG. 5, but illustrates an alternative construction and arrangement for the cutting mechanism of the implement, FIG. 7 is a section taken on the line VII-VII in FIG. 6, and FIG. 8 is a broken sectional view, to an enlarged scale, illustrating an alternative construction and arrangement for some parts of the cutting mechanism of FIGS. 2 and 3.

DESCRIPTION OF THE PREFERRED EMBODIMENTS

Figure 1:
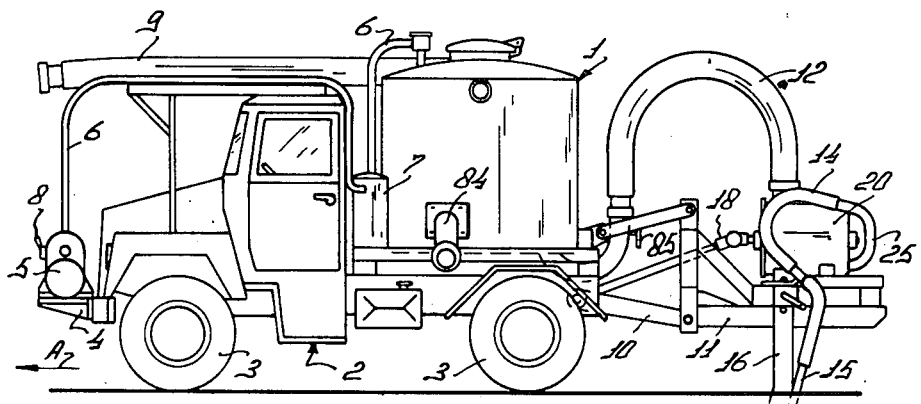
FIG. 1 is a side elevation of a self-propelled implement in accordance with the invention constructed and arranged for use in supplying organic manure mixtures into and/or onto the soil.
Figure 2:
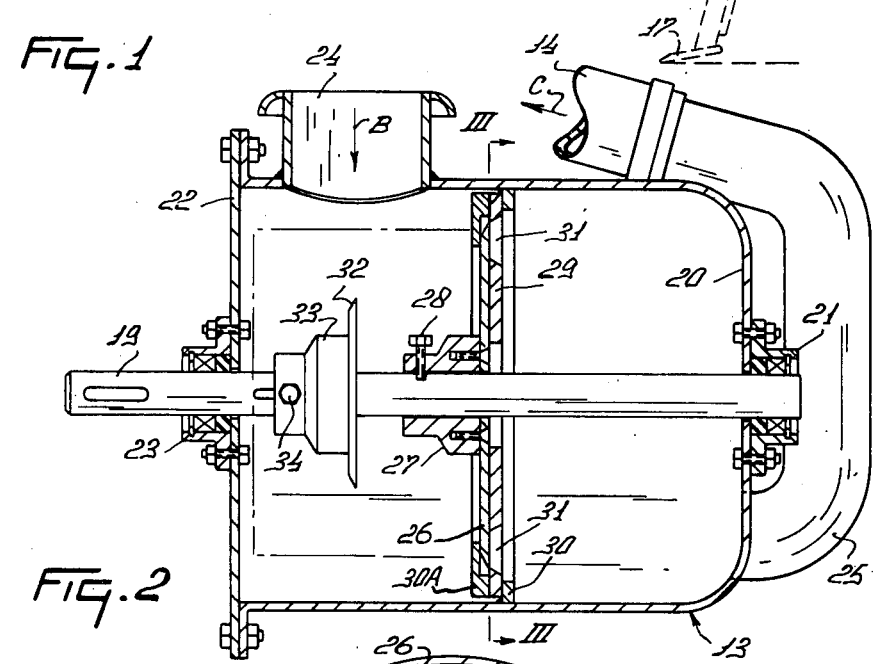
FIG. 2 is a vertical section, to an enlarged scale, of a cutting mechanism of the implement, said mechanism being located at the right-hand side of FIG. 1.
Figure 3:
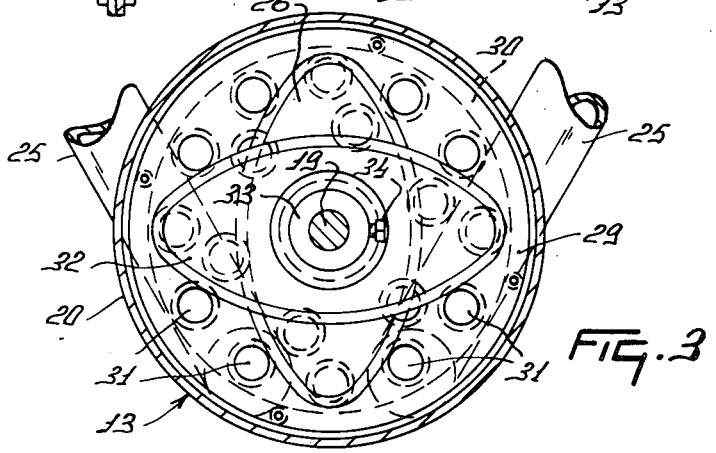
FIG. 3 is a section taken on the line III-III in FIG. 2.

Referring to FIGS. 1 to 3 of the drawings, the self-propelled implement that is illustrated therein comprises a container in the form of a cylindrical tank 1, the tank 1 being mounted on the bed of a truck 2 immediately to the rear of a driving cab of that truck. Truck 2 has four ground wheels 3 the front two of which are steerable and its intended direction of straight forward travel is indicated in FIG. 1 by an arrow A. It will be appreciated that the precise form of the truck 2 is of no great significance and that it could be varied in many respects as compared with the appearance that is illustrated somewhat diagrammatically in FIG. 1. Purely as an example, truck 2 could have a greater number of the ground wheels 3. An air pump 5 is mounted on a bracket 4 carried by the front bumper or fender of truck 2, the pump 5 being arranged to be driven in any convenient manner (that is not illustrated in the drawings) from the adjacent propelling engine of the truck. As an alternative, the air pump 5 may be powered from a small independent motor that, in such a case, would also be mounted on the bracket 4. A pipe opens into the domed top of the tank 1 and said pipe is connected by a duct 6 and a moisture collector 7 to the pump 5. The connection is made by way of a three-way valve 8 which is so arranged that said duct 6 can be placed in communication with either the suction/inlet side of the pump 5 or the compression/outlet side thereof, the third connection of the valve 8 placing that side of the pump 5 which is not coupled to the duct 6 in either case in direct communication with the ambient atmosphere. The tank 1 is provided with a flexible suction hose 9 that is arranged for the supply of liquid organic manure mixtures containing undissolved solids to the interior of the tank 1, said hose 9 advantageously having a diameter of substantially 6 inches (15¼ cms).

The rear of truck 2 with respect to the direction A is provided with a three-point lifting device or hitch 10 to which is connected a rearwardly extending frame 11. The frame 11 carries a cutting mechanism 13 that is shown in detail in FIGS. 2 and 3 of the drawings, the cutting mechanism 13 being connected by a hose 12 to the bottom of the tank 1 and to at least two manure injectors 15 by corresponding tubular outlets 25 and flexible hoses 14, said outlets 25 opening into the bottom of the mechanism 13 at locations remote from an upper tubular inlet 24 of said mechanism which is connected to the hose 12. It is noted that, although the described and illustrated embodiment has two manure injectors 15, it is within the scope of the invention to provide only one manure injector 15 or more than two thereof. The manure injectors 15 are fastened to the rear, with respect to the direction A, of injection tines or blades 16 that extend downwardly from the frame 11 into the soil, during operation of the implement, and which are somewhat similar to rigid and fixed tines of a cultivator. As can be seen in FIG. 1 of the drawings, each injection tine or blade 16 is upwardly and downwardly adjustable in position relative to its mounting on the frame 11 at its upper end, its lower end, that will penetrate more or less deeply into the soil during operation, being inclined forwardly with respect to the direction A from top to bottom by a few degrees. The lowermost extremity of each injection tine or blade 16 carries a goose foot-shaped blade 17 having a general plane which is inclined to the horizontal by a few degrees in such a way that the leading edge of the blade with respect to the direction A is at a slightly lower horizontal level than is the rearmost edge thereof. Each manure injector 15 is secured to the rear of the corresponding tine or blade 16 with respect to the direction A and is in the form of a tube which conveniently has a diameter of between substantially 4 and subtantially 5 cms. Depending upon the nature and condition of the soil to which slurry or other organic manure mixture is to be distributed, each injection tine or blade 16 penetrates downwardly beneath the soil surface by a distance of substantially 15 cms. This distance can be set and maintained by upward or downward adjustment of the tines or blades 16 relative to the frame 11, by upward or downward movement of the three-point lifting device or hitch 10 relative to the body of truck 2 and/or by the provision of at least one depth-control ground wheel (not illustrated).

The cutting mechanism 13 that is shown in detail in FIGS. 2 and 3 of the drawings is driven from the propelling engine of truck 2 by way of a telescopic transmission shaft 18 having universal joints at its opposite ends, the rearmost universal joint of said shaft 18 being coupled to the forwardly projecting end of a substantially horizontally disposed driving shaft 19 of the mechanism 13. The mechanism 13 has a casing 20 that is preferably of substantially cylindrical configuration in which case, as illustrated, the driving shaft 19 substantially coincides in position with the longitudinal axis of the casing. The rearmost end of the casing 20 comprises a substantially vertically disposed wall at the center of which is arranged a fluid-sealed rotary bearing 21 for the rearmost end of the shaft 19. A front wall or cover 22 of the mechanism 13 is secured to a flange of the cylindrically curved wall of the casing by eight bolts and is provided, at its center, with a further fluid-sealed rotary bearing 23 for a leading region of the driving shaft 19, said rotary bearing 23 being in substantially horizontal alignment with the rear rotary bearing 21. The aforementioned upper tubular inlet 24 that communicates with the hose 12 opens into the cylindrical wall of the mechanism 13 quite close to its front wall or cover 22 and, to match the diameter of the hose 12, advantageously has a diameter of substantially 6 inches (15¼cms.). The two tubular outlets 25 open into the rear substantially vertical wall of the casing 20 at locations that are substantially diametrically opposite to the inlet 24 with respect to the geometric center of the housing 20, each tubular outlet 25 advantageously having a diameter of substantially 4 inches (10 cms.). When the implement is in use, the slurry or other organic manure mixture flows into the casing 20 of the mechanism 13 through the tubular inlet 24 in the direction of an arrow B that is shown in FIG. 2 of the drawings and leaves said casing for distribution to the ground through the outlets 25 and the hoses 14 in the direction that is indicated by an arrow C in the same Figure.

Approximately midway along the axial length of the housing 20 of the mechanism 13, the driving shaft 19 of that mechanism carries a cutter blade 26. The cutter blade 26 is releasably fastened to a hub 27 by machine screws and the hub 27 is, in turn, secured against axial and rotational displacement relative to the driving shaft 19 by a releasable set bolt 28. The shape of the cutter blade 26 can be seen best in FIG. 3 of the drawings from which it will be evident that said blade is of smoothly curved elliptic shape although its outer edge does not define a true ellipse. The shaft 19 passes through the geometric center of the blade 26, the maximum length of that blade between the extremities thereof that are farthest from said shaft 19, and thus quite close to the internal surface of the cylindrically curved portion of the casing 20, having a value of between substantially 35 cms. and substantially 45 cms., a magnitude of substantially 40 cms. being advantageous. The minimum width of the blade 26 (measured horizontally in the plane of FIG. 3) has a value of between substantially 15 cms. and substantially 25 cms., a magnitude of substantially 20 cms. being advantageous and being preferred. The two ends of the cutter blade 26 that are farthest apart from one another coincide with a straight line that is contained in a longitudinal plane of symmetry of the blade that intersects the axis of the shaft 19. The blade 26 that is movable during operation of the implement co-operates with a fixed or counter blade 29 that is in the form of a circular disc having its outer edge region secured to a ring 30 that is fastened to the inner surface of the cylindrically curved portion of the casing 20 in perpendicular relationship with the longitudinal axis of that casing and the substantially coincident longitudinal axis of the driving shaft 19. Those portions of the cutter blade 26 which are farthest from the shaft 19 are enclosed between an annular locking element 30A and an outer region of the circular fixed or counter blade 29. The element 30A is fastened to the ring 30 with the fixed or counter blade 29 by a plurality, such as four, of small bolts whose positions can be seen in FIG. 3 of the drawings. The mounting arrangements that have been described enable the cutter blade and/or the fixed or counter blade 29 to be readily replaced should this become necessary. It will be evident that access can be obtained to the interior of the casing 20 for replacement purposes merely by temporarily removing the eight bolts which secure the front wall or cover 22 of said casing to the flange of the cylindrical wall thereof.

The fixed or counter blade 29 is formed with a plurality, such as eighteen, of circular holes 31 having positions which can be seen in FIG. 3 of the drawings, but it is emphasized that a greater or lesser number of the holes 31 may be provided, that their sizes and/or positions may be changed and/or that their shapes may be other than circular. For example, each hole 31 may be of regular polygonal shape and the plurality of those holes that is provided may be regularly arranged within at least one circumscribing circle. It can be seen in FIG. 2 of the drawings that, with respect to the directions B and C, each hole 31 is frusto-conically divergent through the thickness of the fixed or counter blade 29 from the surface thereof which faces the movable cutter blade 26 to the surface thereof which faces the ring 30. An intimate contact is obtained between the cutter blade 26 and the fixed or counter blade 29 and the result is that the cutter blade 26 is self-sharpening. It is preferred that each hole 31 should have a diameter of substantially 4 cms. and that diameter should not be greater than substantially 6 cms. In the particular example that is being described, there is an outer circular row of twelve regularly spaced apart holes 31 and an inner circular row of six regularly spaced apart holes 31, the center of the two circular rows being coincident with one another and with the longitudinal axis of the shaft 19. With this arrangement, the holes 31 of the inner and outer rows are radially offset from one another in the surface of the fixed or counter blade 29. It has been found that, in order to ensure that the slurry or other organic manure mixture will flow entirely satisfactorily through the cutting mechanism 13, the total open area of the holes 31 should be substantially 30% greater than the open area of the upper tubular inlet 24.

A second blade or pre-cutter 32 is disposed before the cutter blade 26 along the driving shaft 19 with respect to the directions B and C. The second blade or pre-cutter 32 is located in that chamber of the casing 20 of the mechanism 13 into which slurry or other organic manure mixture is delivered from the tubular inlet 24 in the direction B. It is preferred that, as illustrated, the second blade or pre-cutter 32 should be identical to the cutter blade 26. With this preferred arrangement, the blade or pre-cutter 32 is secured by countersunk machine screws (not visible) to a sleeve-like hub 33, that hub being secured against axial and angular displacement relative to the shaft 19 by a set bolt 34, the tip of which co-operates with an axially extending groove formed in the surface of the shaft 19. It will be evident that the parts 32 and 33 can be retained in different axial positions along the shaft 19 by tightening the set bolt 34 in different settings lengthwise of the groove in the shaft 19. In fact, the two set bolts 28 and 34 are arranged to co-operate with the shaft 19 in such a way that the cutter blade 26 and second blade or pre-cutter 32 can be spaced apart from one another at different distances and can occupy more or less registering angular settings about the axis of the shaft 19. It is preferred that, as illustrated, the second blade or pre-cutter 32 should be 90° out of register with the cutter blade 26 about the axis of the shaft 19. In other words, as seen in FIG. 3 of the drawings, a line joining the farthest apart extremities of the blade or pre-cutter 32 should be inclined at 90° to a line joining the farthest apart extremities of the cutter blade 26.

It is preferred that, as illustrated, the cylindrically curved wall of the casing 20 should merge into the substantially vertically disposed rear wall thereof by way of rounded corners to ensure a satisfactory flow of the material around those corners and little or no lodgement of solid portions of the material therein. The cylindrical casing 20 has a diameter of between substantially 35 cms. and substantially 45 cms., a diameter of substantially 40 cms. being preferred and it will, of course, be realized that this diameter matches the maximum diameter of the cutter blade 26 and the second blade or pre-cutter 32 so that the outer ends of those parts 26 and 32 which are farthest from the shaft 19 closely approach the inner surface of the cylindrically curved wall of the casing 20. The fixed or counter blade 29 effectively divides the interior of the casing 20 into a pre-treatment or material-receiving chamber and a post-treatment or delivery chamber. It is important that these two chambers should have definite predetermined volumes and, in the example that is being described, the pre-treatment or material-receiving chamber that is in direct communication with the upper tubular inlet 24 has an axial length of between substantially 15 cms. and substantially 30 cms.

Figure 4:
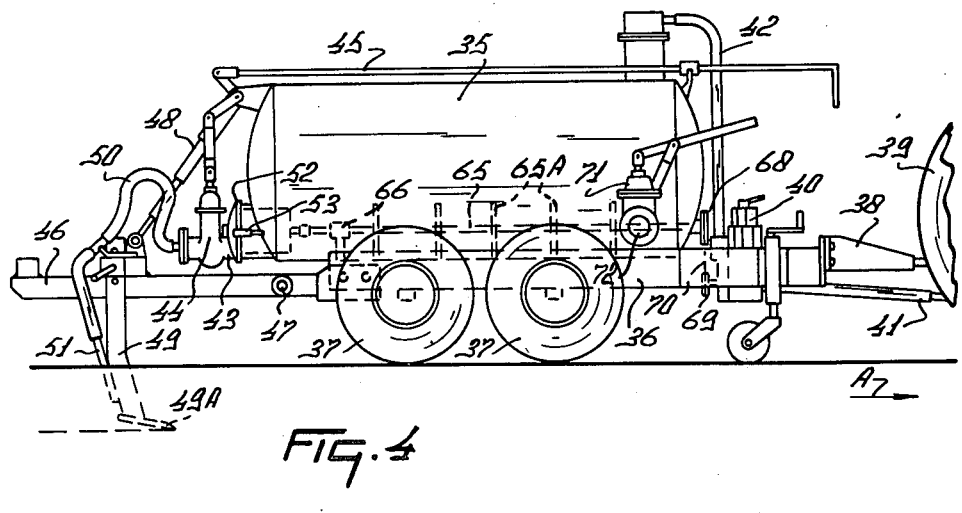
FIG. 4 is a side elevation of an implement that is constructed and arranged for the same purpose as the implement of FIGS. 1 to 3 but which is a towed, rather than self-propelled, implement.
Figure 5:
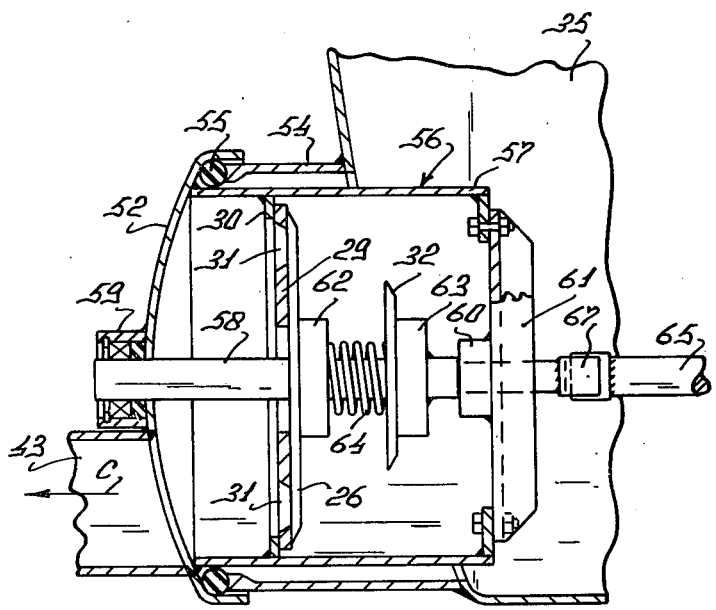
FIG. 5 is a vertical section, to an enlarged scale, of a cutting mechanism of the implement of FIG. 4 that is to be seen towards the left-hand side of FIG. 4.

FIGS. 4 and 5 of the drawings illustrate an alternative form of implement in accordance with the invention which implement is constructed and arranged to be towed by an agricultural tractor 39 or other operating vehicle. To this end, a chassis 36 of the implement has a triangular towing member 38 at its leading end, with respect to the direction A, said member 38 being adapted to have its apex connected to a tow bar, hitch pin or the like of the tractor 39 or other vehicle. The chassis 36 is provided with two pairs of large ground wheels 37 and supports a container in the form of a cylindrical tank 35, the longitudinal axis of which is substantially horizontally disposed. An air pump 40 is mounted on the chassis 36 immediately to the rear of the towing member 38 and is arranged to be driven from the power take-off shaft of the agricultural tractor 39 or other operating vehicle by way of an intermediate telescopic transmission shaft 41 that is of a construction which is known per se having universal joints at its opposite ends. However, as in the preceding embodiment, the air pump 40 may, if preferred, be driven by a small independent motor which would be mounted at the front of the chassis 36. A turret at the top and front of the tank 35 with respect to the direction A is connected by a duct 42 to the air pump 40. As in the case of the first embodiment, a valve is provided by which said duct 42 can be coupled to either the suction or inlet side of the pump 40 or to the compression or outlet side thereof, that side of the pump which is not coupled to the duct 42 in either case being opened by said valve to the ambient atmosphere. An outlet 43 is provided at the rearmost end of the tank 35 and is furnished with a regulating valve 44. With this arrangement it is, in fact, desirable that the longitudinal axis of the tank 35 should be gently inclined to the horizontal in such a way that the center of the front of the tank is at a slightly higher horizontal level than is the center of the rear thereof. The operating member of the regulating valve 44 is connected by a lever, rod and pivot system 45 to a handle which projects forwardly at the front of the implement to a location from which it will be accessible to a driver of the tractor 39 or other operating vehicle when the implement is in use. This enables the driver to operate the valve 44 without having to leave his driving seat. A substantially horizontally disposed frame 46 extends rearwardly behind the chassis 36 to which chassis said frame 46 is connected by a horizontally disposed pivotal shaft 47 that extends perpendicular to the direction A. A double-acting hydraulic piston and cylinder assembly 48 pivotally interconnects a bracket mounted on top of the frame 46 and a lug carried by the tank 35 and is powered from the hydraulic system of the tractor 39 or other vehicle under the control of an operating member that is accessible to the driver of that tractor or other vehicle. The hydraulic ducts that are necessary for this purpose are not illustrated in the drawings. Thus, the frame 46 and the parts which it carries can be turned upwardly and downwardly relative to the chassis 36 about the axis of the pivotal shaft 47. In the example that is being described, the hydraulic piston and cylinder assembly 48 has a stroke length of substantially 80 cms. The frame 46 is provided, towards its rear with respect to the direction A, with at least one injection tine or blade 49 that is similar in construction and arrangement to the previously described injection tines or blades 16, each tine or blade 49 having a goose foot-shaped blade 49A at its lowermost end. The rear of each injection tine or blade 49 with respect to the direction A has a tubular manure injector 51 secured to it, the upper end thereof being in communication, by way of at least one tube and at least one flexible hose 50, with the delivery side of the regulating valve 44 that is carried by the outlet 43 of the tank 35. The flexibility of each hose 50 enables the frame 46 to be turned upwardly or downwardly about the pivotal shaft 47 without interfering with the delivery of slurry or other manure mixture to the or each manure injector 51.

The outlet 43 of the tank 35 opens from a lower region of a domed manhole or handhole cover 52 that is normally retained in its effective closing position by two clamps 53. The cover 52 is of circular shape as viewed in the direction A and, when clamped in its normal closing position, bears surroundingly against a short tubular extension 54 of the tank 35 through the intermediary of a large resilient sealing ring 55 of circular cross-section. The short tubular extension 54 of the tank 35 is of circular cross-section and is welded to the rearmost end of said tank very close to the bottom thereof. The tubular extension 54 has a diameter of between substantially 40 cms. and substantially 50 cms., a magnitude of substantially 45 cms. being preferred.

A cutting mechanism 56 is accommodated inside the tubular extension 54 of the tank 35, the rearmost end of a cylindrical casing 57 of said mechanism 56 being welded or otherwise rigidly secured to the inner concave surface of the domed manhole or handhole cover 52. The mechanism 56 is, in many respects, similar to the mechanism 13 that has already been described and parts that are substantially identical to parts which have already been discussed in connection with FIGS. 1 to 3 of the drawings are indicated in FIG. 5 of the drawings by the same reference numerals as are employed in FIGS. 2 and 3 of the drawings. The cutting mechanism 56 has an axially extending driving shaft 58 which is thus substantially horizontally disposed, the rearmost end of said shaft 58 being rotatably supported by a fluid-sealed bearing 59 at the center of the cover 52 and a leading region thereof being rotatably supported by a further fluid-sealed bearing 60 which is fastenend to two parallel strips 61 of L-shaped cross-section having upper and lower ends which are releasably bolted to inwardly directed upper and lower lugs at the leading edge of the casing 57. The shaft 58 passes between the two parallel strips 61 immediately in front of the leading rotary bearing 60. In this embodiment, the cutter blade 26 is releasably secured by countersunk machine screws (not visible) to a sleeve or ring 62 which surrounds the driving shaft 58 in a manner which enables it to be axially displaceable along that shaft while at the same time it is not significantly angularly displaceable relative thereto. Co-operating splines (not visible) are provided for this purpose. The second blade or pre-cutter 32 is also releasably secured by countersunk machine screws (not visible) to a sleeve or ring 63 that is, however, welded or otherwise rigidly secured to the shaft 58. A helical compression spring 64 is wound around the shaft 58 so as to bear between the second blade or pre-cutter 32 and the axially displaceable sleeve or ring 62 to which the cutter blade 26 is fastened. Thus, the spring 64 constantly urges the sleeve or ring 62 and the cutter blade 26 to the left as seen in FIG. 5 of the drawings and thus into intimate self-sharpening engagement with the fixed or counter blade 29. That end of the cutting mechanism 56 that faces forwardly with respect to the direction A into the interior of the tank 35 is wholly open around the bearing 60 apart from the provision of the two parallel strips 61 by which that bearing 60 is carried. Once again, as in the preceding embodiment, the fixed or counter blade 29 effectively divides the interior of the housing 57 of the mechanism 56 into two separate chambers. The outlet 43 of the tank 35 is in direct communication with the post-treatment or delivery chamber of the mechanism 56 that is to the left of the fixed or counter blade 29 as viewed in FIG. 5 of the drawings.

A rotary shaft 65 that is substantially horizontally disposed extends lengthwise through the tank 35 near the bottom thereof from which it is rotatably supported by at least one sleeve bearing 66. The shaft 65 is provided, inside the tank 35, with a plurality of agitator/cutter blades 65A. The rearmost end of the shaft 65 is drivingly connected to the leading end of the shaft 58, inside the tank 35, by a fork coupling 67. The construction and arrangement of the fork coupling 67 are such that the shaft 58 can be axially disconnected from the shaft 65 without any difficulty when removal of the cutting mechanism 56 from the remainder of the implement is required. Conversely, when the cover 52 is closed and the mechanism 56 is in its operative position, the co-operating parts of the fork coupling 67 drivingly engage one another in an automatic manner that does not require the use of any bolts or other fastenings. The leading end of the shaft 65 with respect to the direction A is passed through a liquid-sealed bearing in the front wall of the tank 35 and is there provided with a pulley 68 that is driven from an underlying smaller pulley 69 by way of a V-belt 70 or the like. The pulley 69 is mounted on a rotary output shaft of the air pump 40 and will thus be driven, during operation, from the power take-off shaft of the tractor 39 or other vehicle through the intermediary of the telescopic transmission shaft 41 or from the alternative independent motor that may be provided to drive the air pump 40. The driving shaft of the air pump 40 should rotate at a speed of substantially 1500 revolutions per minute and the transmission ratio between the pulleys 69 and 68 is such as to produce a speed of rotation of the shaft 65 of substantially 540 revolutions per minute. However, if desired, the transmission ratio may be changed so that the shaft 65 can be rotated at a speed of up to substantially 1100 revolutions per minute.

It is desirable, but not absolutely essential, to provide the tank 35 with a separate suction opening which can be employed when said tank is to be filled. An inlet opening 72 (FIG. 4) is provided for this purpose near the bottom of the tank 35 and near to the front thereof with respect to the direction A, said inlet opening 72 being provided with a manually operable shut-off valve 71 with an actuating lever which projects forwardly to a location where it will be accessible to the driver of the tractor 39 or other operating vehicle without that driver having to leave his seat on the vehicle. Although positioning of the inlet opening 72 at this point is convenient, it is by no means essential and it may, if preferred, be furnished at some other location on the tank 35.

FIGS. 6 and 7 of the drawings illustrate an alternative to the construction and arrangement that is illustrated in FIGS. 4 and 5 in which a cutting mechanism 73 is partly countersunk into the cylindrically curved side wall of the tank 35 instead of being mounted at the rearmost end thereof as is the mechanism 56. However, the mechanism 73 comprises parts that are identical or substantially identical to parts that have already been described and such parts will not be described in detail again and are indicated in FIGS. 6 and 7 by the same reference numerals as are employed in the preceding Figures. The mechanism 73 has a cylindrical casing 74 having a longitudinal axis which is parallel or substantially parallel to that of the cylindrical tank 35, said casing 74 being arranged in the cylindrically curved wall of the tank 35 in such a way that substantially one third of its volume is countersunk into the tank 35 (see FIG. 7). Thus, with this arrangement, an axially disposed driving shaft 75 of the mechanism 73 is located outwardly just beyond said curved wall of the tank 35. Angle brackets 76 welded to the external surface of the casing 74 co-operate with the wall of the tank 35 by way of intervening sealing strips, the liquid-sealed co-operation being maintained by a plurality of bolts 77. In the embodiment of FIGS. 6 and 7 of the drawings, two of the holes 31 in the fixed or counter blade 29 are covered by a sharpening stone 78 releasably mounted on counterblade 29 formed, for example, from silicon carbide. The sharpening stone 78 is received in one hole 31 in the outer circular row of those holes and one hole 31 in the inner circular row thereof and ensures that the automatic self-sharpening of the cutter blade 26 by its continuous spring-loaded contact with the fixed or counter blade 29 is continuously and effectively maintained. The sharpening stone 78 may, of course, also be provided in the embodiment that is illustrated in FIGS. 2 and 3 of the drawings and in the embodiment that is illustrated in FIG. 5 thereof even though, in the first case, there is no resilient loading of the cutter blade 26 against the fixed or counter blade 29.

As in the preceding embodiments, the fixed or counter blade 29 effectively divides the interior of the casing 73 into two chambers, the inlet opening 72 being in direct communication with the pre-treatment or material-receiving chamber while the post-treatment or delivery chamber is located rearwardly of the fixed or counter blade 29 with respect to the direction D (FIG. 7) in which slurry or other organic manure mixture moves through the cutting mechanism 73 during the use of the implement. The driving shaft 75 of the mechanism 73 is rotatably journalled at opposite ends of the cylindrical housing 74 in fluid-, or at least liquid-, sealed bearings 80 and 81, the end of said shaft 75 that is closest to the bearing 81 being provided with a pulley 82 to which rotary power is transmitted from a further pulley (not shown) by a V-belt 83. The wall of the casing 74 is, of course, formed in the region thereof that is located internally of the tank 35 with a hole 79 of large diameter through which the slurry or other organic manure mixture that has been chopped by the blades of the mechanism 73 passes in the direction D into the tank 35.

The cutting mechanism 73 that is located at the inlet of the tank 35 could, of course, equally well be provided in the embodiment of FIGS. 1 to 3 of the drawings in which case it would communicate directly with an inlet opening 84 (FIG. 1) of the tank 1. The flexible suction hose 9 is, of course, usually connected to the inlet opening 84 when the tank 1 is to be filled. Moreover, if desired, in both of the basic embodiments that have been described, a cutting mechanism may be provided in association with both the inlet and the outlet of the tank 1 or 35.

FIG. 8 of the drawings illustrates, to an enlarged scale, an alternative embodiment of an annular locking member for the rotary cutter blade 26. Said annular locking member is in the form of a bent-over portion 20A of the casing 20 and has the shape of a flange which registers with a perpendicularly bent-over flange 20B of a separate, in this embodiment, part of the casing 20. An outer edge region of the circular fixed or counter blade 29 is clamped between the bent-over portion 20A and the flange 20B by a plurality of bolts together with an intervening shim plate 20C. Shim plates 20C of different thicknesses can be substituted for the illustrated plate 20C or an appropriate number of similar but very thin shim plates can be employed so that the distance between the portion 20A and the flange 20B can be adjusted to compensate for inevitable wear of the rotary cutter blade 26.

In the use of the implement that has been described with reference to FIGS. 1 to 3 of the drawings with or without the modification of FIG. 8, the tank 1 is first filled from a pit or other bulk supply of slurry or other liquid organic manure mixture containing undissolved solids, filling being effected by coupling the hose 9 to the inlet 84 and operating the air pump 5 with the valve 8 in a position in which the duct 6 is coupled to the suction or inlet side of the pump. The tank 1 has a moderate capacity of, for example, substantially 2000 liters and the implement of which it forms a part is particularly suitable for use in applying organic manure mixture into and/or onto soil in which plants are growing, or are to be grown, by row culture. Examples of such plants are maize, beans, potatoes and so on. With the aforementioned moderate capacity of the tank 1, the tires of the ground wheels 3 may be relatively narrow in an axial direction without their pressure against the ground surface becoming unacceptably great. When the implement is to be used on land which is not already growing a crop or for the fertilization of rows of crops that are not unduly retarded in growth by the passage of ground wheels exerting a high pressure, a tank 1 of greater volumetric capacity than that mentioned above can be used. Although the implement can, of course, be adjusted to distribute the slurry or other organic manure mixture directly onto the ground surface, it is generally preferable to use it in the manner illustrated in the drawings in which all, or most, of the manure is forced into the soil beneath ground level by the air under pressure that is provided from the air pump 5. This way of operating the implement minimizes wastage of the manure and greatly reduces the unpleasant and lingering odor that is produced by direct distribution onto the ground surface.

The frame 11 that is connected to the three-point lifting device or hitch 10 to the rear of the tank 1 preferably comprises two or more of the injection tines or blades 16 each of which is furnished with a corresponding one of the manure injectors 15. The frame 11 to which the injection tines or blades 16 are connected is preferably pivotally mounted with the aid of ball bearings so that the tines or blades 16 and the manure injectors 15 which they carry will be movable not only upwards and downwards to enable the required operating depth to be set but also laterally to some extent. Lateral swingability can be advantageous because the slurry or other manure mixture is then distributed into the soil along more or less zig-zag lines. The implement that has been described with reference to FIGS. 1 to 3 of the drawings may comprise four of the injection tines or blades 16 and corresponding manure injectors 15 spaced apart from one another in a direction perpendicular to the direction A but, of course, the number of these assemblies and their relative spacing will depend upon the working width of the implement, the spacing between any rows of plants in the land that is to be fertilized and the volume of manure per unit area of land that is to be delivered. Under some working conditions, particularly when the manure injectors 15 are operating at a shallow depth, the use of substantially horizontally disposed covering discs immediately above ground level may be advantageous. Depending upon the nature and condition of the soil that is to be fertilized, the tines or blades 16 may be set to penetrate into the soil to a depth of between substantially 10 and substantially 15 cms. It will be evident that, when more than two of the manure injectors 15 are provided, some branching of the tubular outlets 25 or of the hoses 14 will be necessary but this is not shown in the drawings.

Once the tank 1 has been filled from a bulk supply of slurry or other liquid organic manure mixture containing undissolved solids by way of the inlet opening 84, the three-way valve 8 is moved from the position in which it applies suction to the interior of the tank 1 to the position in which it connects the interior of said tank to the compression/outlet side of the pump 5. The inlet opening 84 is, of course, provided with a shut-off valve (not shown) by which it is kept closed when it is not in use. As soon as the pressure in the tank 1 is greater than the ambient air pressure by a value of substantially 1 atmosphere, a valve 85 (FIG. 1) is opened and the slurry or other manure mixture within the tank 1 is indirectly forced by the pump 5 out of said tank through a pipe opening into the bottom thereof and into the hose 12 and thence through the tubular inlet 24 into the pre-treatment or material-receiving chamber of the cutting mechanism 13. The second blade or pre-cutter 32 rotates in the chamber that has just been mentioned without co-operating with any counterblade or the like but will, of course, cut any large and/or coarse solid constituents of the slurry or other manure mixture into smaller pieces. The second blade or pre-cutter 32 is, like the cutter blade 26, of generally elliptical shape and comprises two opposed and arcuately curved convex cutting edges. This shape is important and has the practical result that, during operation, large and/or coarse solid lumps of the manure are sliced rather than being chopped. Quite small lumps of the manure are thus produced without damage to the second blade or pre-cutter 32. It will be noted that the second blade or pre-cutter 32 is so positioned relative to the tubular inlet 24 that, when the shaft 19 is rotating, lumps of manure entering the mechanism 13 in the direction B meet the cutting edge of the blade 32 that is moving towards them in a substantially opposite direction. The collision speed between the blade 32 and the lumps of manure entering in the direction B is thus quite high and this is conductive to rapid and effective slicing of the manure lumps.

The arrangement of the second blade or pre-cutter 32 in advance of the cutter blade 26 and its co-operating fixed or counter blade 29 with respect to the directions B and C has the advantage that the blade 32 will thoroughly slice up any unusually large and/or coarse lumps of manure before they reach the co-operating parts 26 and 29, thus ensuring that the latter parts will not be subjected to damagingly high loads and that the risk of the mechanism 13 becoming clogged is brought to a very low level. Moreover, the provision of the second blade or pre-cutter 32 increases the volume of slurry or other manure mixture per unit time that can be dealt with effectively by the mechanism 13. The pressure of substantially 1 atmosphere above the pressure of the ambient atmosphere under which the slurry or other organic manure mixture is forced into the mechanism 13 through its inlet 24 causes that mixture to move towards the rotary cutter blade 26 and its co-operating fixed or counter blade 29. These blades still further reduce the size of the lumps of solid material in the mixture until the sliced up lumps are small enough to pass through the holes 31 in the fixed or counter blade 29 and thus into the post-treatment or delivery chamber of the mechanism 13. The sizes of the holes 31 are, of course, important and it has been found that, as previously mentioned, each hole should have a diameter which does not exceed between 4 and 6 cms. If a larger diameter were to be used, or if a manure injection operation were to be effected without employing the cutting mechanism, the danger of blockage of the manure injectors 15 and the tubular members (14, 25) through which those injectors 15 are fed would be very greatly increased with the likelihood of frequent and tiresome blockages occurring during any manure distributing operation.

The preceding paragraph discusses the danger of clogging or blockage and the manner in which that danger is eliminated, or very greatly reduced, in accordance with the present invention but it will be appreciated that clogging and blockage could be eliminated, or be very greatly reduced, by operating at a much higher pressure than substantially 1 atmosphere. However, this answer to the problem has the grave disadvantage that the tank 1 and the various ducts would have to be constructed so as to be capable of withstanding such greatly increased pressure. Particularly in the case of the tank 1, it would need to be made in a similar way to a high pressure steam boiler which would very significantly increase its cost and make it necessary that it should comply with the various safety regulations that apply to such equipment. Moreover, with such an arrangement, the manure would inevitably be injected into the soil at high pressure and this produces a considerably less satisfactory result because the injected manure tends to escape upwardly in a manner wherein the degree of vigour is proportional to the injection pressure concerned. Although the results might be acceptable on very heavy land, they would be quite unsatisfactory on light and/or porous and/or cracked soil.

The injection of the manure at a relatively low pressure is clearly desirable but involves the problem of clogging and blockage. This problem is solved, or very greatly reduced, in implements in accordance with the invention by the provision of the various cutting mechanisms 13, 56 and 73. Lumps of manure that are sliced up by the second blade or pre-cutter 32 and by the rotary cutter blade 26 and its co-operating fixed or counter blade 29 are forced at relatively low pressure through the small diameter holes 31 into the post-treatment or delivery chamber of the mechanism concerned from which the mixture passes in the direction C or D to the injectors 15 or 51, clogging or blockage being a very rare event because of the small size of the lumps of solid material in the manure mixture once that mixture leaves the cutting mechanism. It is not absolutely exxential that the second blade or pre-cutter 32 should be provided in all cases but, under most conditions, the irregular and coarse consistency of the solid constituents of manure mixtures makes its provision most desirable. By virtue of the provision of the cutting mechanism 13, 56 or 73 an implement in accordance with the invention can inject into the soil mixed manures, that are primarily organic in nature, of almost any composition. For example, mixtures containing coarse poultry manure and feathers, waste fodder, heaped manure with straw, soil and so on can all be dealt with satisfactorily provided only that there is a sufficient liquid content to bring the mixture to an at least semi-liquid condition. Obviously, in accordance with known practice, water can be added to produce the necessary consistency of the mixture when so required. A significant advantage of the cutting mechanism 13 is that its tubular outlets 25 may have a small diameter of, conveniently, substantially 4 inches (10 cms.). The hoses 14 may thus also be of a matching diameter which is considerably smaller than that of the hoses that are conventionally employed in manure injection work with prior art implements. The small diameter has the advantage that the outlets and hoses are less expensive to produce and that the joints between them are light in weight and can be readily manipulated without great effort.

The cutting mechanism that has been described may advantageously be employed in a spreading implement that has a broad working width and that functions by using a known spreading plate (as described in United Kingdom Pat. No. 813512). Not only are the advantages of the smaller diameter lightweight pipes and hoses and their interconnecting joints obtained but also the advantage that the manure mixture is fed to the soil in a uniformly homogeneous condition so that its beneficial effect upon the soil is improved. In fact, the cutting mechanism 13 may be employed in a number of implements for distributing manure to the soil which implements also perform other simultaneous operations such as, for example, harrowing, seed sowing, planting and so on. The cutting mechanism 13 can be employed in a so-called central conduit system for feeding manure to the soil, the use of the mechanism 13 being particularly advantageous because such systems include very long ducts that are otherwise frequently subject to clogging and blockage. In such cases, the holes 31 may have somewhat larger diameters than are desirable in the case of the implements that have been described but, nevertheless, the holes 31 should not have diameters that are greater than substantially 6 cms. The lifetime of each replaceable rotary cutter blade 26 can be effectively doubled if the direction of rotation of the driving shaft 19, 58 or 75 can be reversed since, upon such reversal, the leading and trailing positions of the cutting edges of each cutter blade 26 are interchanged.

If desired, the driving shaft 19 may be provided with a plurality of knives at intervals along its length so that said knives will assist in reducing the size of the lumps or other solid constituents of the manure mixture. As previously mentioned, the speed of rotation of the shaft 19 will normally be of the order of substantially 540 revolutions per minute but, particularly when the shaft 19 is provided with a plurality of knives, the speed of rotation of the shaft may advantageously be raised to substantially 1100 revolutions per minute. When a predetermined volume of manure mixture is to be delivered from the implement per unit time the speed of rotation of the shaft 19 will be subject to a maximum value whose magnitude will depend upon a number of variable factors. An alternative fixed or counter blade 29 may then be provided which has a larger number of holes 31 that are of smaller diameter but, generally speaking, a somewhat increased operating pressure is required under these circumstances. It is noted again that the holes 31 need not be of circular shape. Holes of regular polygonal shape and even holes of irregular shapes arranged inside at least one circumscribing circle will, in most cases, give satisfactory results. The cutting edge of the blade 26 advantageously and preferably has a length which is not less than twice the diameter or greatest width of each hole 31 to ensure an optimum cutting action. Whatever the shape of each hole 31, it is greatly preferred that it should be of divergent formation through the thickness of the fixed or counter blade 29 considered in the directions of flow B and C.

Feathers and other components of some manure mixtures tend to become lodged between the rotary cutter blade 26 and the co-operating fixed or counter blade 29. However, continuing operation is usually effective in breaking up and removing such items. The bent-over portion 20A (FIG. 8) of the casing 20 or the annular locking element 30A ensures, throughout the useful lifetime of each cutter blade 26, a satisfactory degree of engagement between that blade and the co-operating fixed or counter blade 29. It is noted that the bent-over portion 20A or the annular locking element 30A can be employed in the cutting mechanism 56 of FIG. 5 or in the cutting mechanism 73 of FIGS. 6 and 7 in either of which cases the compression spring 64 may be omitted and said blade 26 be fixedly, rather than axially slideably, secured to the driving shaft 58 or 75. The division of the casing 20 into two parts that are bolted together at the bent-over portion 20A and the flange 20B in the embodiment of FIG. 8 of the drawings is advantageous in affording ready access to the cutter blade 26 and the fixed or counter blade 29 for replacement or adjustment purposes when required.

The cutting mechanism 13 will only operate in a consistently satisfactory manner if there is an adequate pressure difference between its inlet opening 24 and its tubular outlets 25. It has been found that, if good operating results are to be maintained, this pressure difference should not be less than substantially half an atmosphere and it is noted that, with the described operating pressure of substantially 1 atmosphere and a pressure not much in excess of the ambient atmospheric pressure at the output end of the or each manure injector 15, the required pressure difference of not less than half an atmosphere between the inlet and outlet ends of the cutting mechanism 13 is readily achieved. If, as is often the case, a plurality of manure injectors 15 are employed, it can be useful to form the casing 20 of the mechanism 13 with a corresponding plurality of tubular outlets 25 thus making complicated and expensive branched outlet manifolds unnecessary. Conversely, a plurality of tubular outlets 25 is by no means essential since a relatively simple branched outlet manifold to a plurality of the manure injectors 15 will often suffice because the danger of clogging or blockage downstream of the mechanism 13 is very greatly reduced. If either of the blades 26 or 32 should be damaged or if adjustment of the mechanism 13 is necessary to match changed operating conditions, access to the parts needing replacement or adjustment is readily obtainable merely by removing the bolts which hold the front wall or cover 22 in place relative to the remainder of the casing 20. The spacing between the blades 26 and 32 and the angular difference between them about the axis of the shaft 19 is readily adjusted after loosening the set bolts 28 and 34.

In the case of the towed implement of FIGS. 4 and 5 of the drawings, its cutting mechanism 56 is arranged at the rear of the substantially horizontally disposed cylindrical tank 35. The arrangement of the mechanism 56 underneath the manhole or handhole cover 52 is advantageous because it avoids the provision of any significant number of projecting parts and, during operation, ensures a regular supply of the manure mixture from the tank 35 with its solid constituents well comminuted. The connection between the rotary shaft 65 and the driving shaft 58 of the mechanism 56 by way of the fork coupling 67 is very convenient since it allows the cover 52 and the mechanism 56 that is secured thereto to be released without difficulty and to be reinstalled in such a way that the drive between the two shafts 65 and 58 is substantially automatically reengaged. The simple and compact mounting and drive of the rotary shaft 65 that have been described and that are illustrated in FIG. 4, in particular, of the drawings are convenient because the agitator/cutter blades 65A which are carried by said shaft inside the tank 35 tend to maintain the slurry or other manure mixture in a more or less homogeneous condition within the tank and to break up any initially very large solid constituents thereof. The stirring effect that is produced by the blades 65A tends to ensure that solid constituents of the manure mixture do not settle to the bottom of the tank and will thus flow towards the cutting mechanism 56 with the rest of the mixture when a manure distribution operation is in progress. The leading end of the casing 57 is substantially completely open except for the bearing 60 and the strips 61 by which it is supported and, therefore, the raised pressure which is produced in the tank 35 by the pump 40 (preferably substantially 1 atmosphere) causes the mixture to flow towards the outlet 43 as soon as the valve 44 is opened. The solid constituents of the manure mixture are first sliced into smaller pieces by the second blade or precutter 32 during after which the mixture moves towards the rotating cutter blade 26 and the co-operating fixed or counter blade 29, those parts reducing the solid constituents of the mixture to a size that will pass through the holes 31 in the fixed or counter blade 29 under the action of the pressure difference between the inlet and outlet sides of the mechanism 56. The treated mixture, containing substantially only small solid pieces, passes from the post-treatment or delivery chamber of the casing 57 through the outlet 43 in the direction C towards the open valve 44 and the or each manure injector 51.

Once again, as in the case of the embodiment of FIGS. 1 to 3 of the drawings, consistently satisfactory operation of the cutting mechanism 56 is dependent upon the maintenance of an adequate pressure difference between its inlet and outlet sides. The compression spring 64 automatically maintains the rotary blade 26 in correct contacting engagement with the fixed or counter blade 29 and said spring 64 may be so arranged that, in the event of an unusual accumulation of solid material causing overload, it will be further compressed and will prevent, or greatly reduce, damage to the blades 26 and 29 from this cause. As in the preceding embodiment, the valve 44, each hose 50 and each manure injector 51 may have significantly smaller diameters than are conventional in manure spreading and/or injecting implements that do not comprise a cutting mechanism. The previously mentioned advantages of lightness in weight, reduction in expense and easy handling are thus again obtained. As in the case of the cutting mechanism 13, the cutting mechanism 56 may be employed in other manure mixing and distributing implements to produce manure mixtures wherein the solid constituents do not exceed an advantageously small size, said constituents being distributed substantially homogeneously throughout the mixture. In the embodiment of FIGS. 4 and 5 of the drawings, each injection tine or blade 49 can be moved upwardly or downwardly, as may be required, by turning the frame 46 upwardly or downwardly relative to the chassis 36 about the pivotal shaft 47 using the double-acting piston and cylinder assembly 48 that is controlled from the driving seat of the agricultural tractor or other vehicle that operates the implement. The precise number of injection tines or blades 49 that are provided, and the number of associated manure injectors 51, is chosen in accordance with the width of the strip of land that is to be treated, the spacing between a plurality of assemblies 49, 49A and 51 being dictated by the spacing between any rows of plants that are growing, or that are to be grown, upon the land being treated. Once again, the depth at which the injection of manure takes place should be between substantially 10 cms. and substantially 15 cms. beneath the ground surface depending upon the nature of the soil being treated and its condition at the time of treatment. It will be appreciated that a change in working depth is readily brought about by increasing or decreasing the effective length of the hydraulic piston and cylinder assembly 48 and that, when the implement is to be transported from one place to another without performing any manure injecting operation, the piston rod of the assembly 48 can be fully retracted to turn the frame 46 upwardly as far as possible about the pivotal shaft 47 and thus raise the parts 49, 49A and 51 to a level above that of the ground surface.

When the cutting mechanism 73 of FIGS. 6 and 7 of the drawings is employed in association with the inlet opening 72 of the tank 35, said mechanism performs its function during filling of the tank and the initially untreated manure mixture is caused to flow in the direction B and subsequently, after treatment, in the direction D by the difference between the prevailing atmospheric pressure and the sub-atmospheric pressure that is produced in the tank 35 by the action of the pump 40. If desired, a cutting mechanism corresponding to the mechanism 73 may be provided in connection with the inlet opening 84 of the embodiment of FIGS. 1 to 3 of the drawings partially inside the tank 1 in which case the valve 85 may, like the other valves that are disposed downstream of at least one of the cutting mechanisms, be of lighter construction and smaller effective diameter than is conventional in ducting for solid-containing organic slurry and other manure mixtures. In the arrangement that has been described with reference to FIGS. 6 and 7 of the drawings, the casing 74 of the mechanism 73 is partly recessed, in a simple manner, into the cylindrically curved wall of the tank 35 very near to the front of that tank with respect to the direction A, said casing 74 being in direct communication with the shut-off valve 71 and its inlet opening 72. The mechanism 73 operates in a manner which is very similar to that of the mechanisms 13 and 56. The driving shaft 75 of the mechanism 73 is located externally of the tank 35 and is conveniently powered from the pulley 69, or from an adjoining pulley, on the shaft that operates the air pump 40, the drive being transmitted from the pulley 69 or its immediate neighbor to the pulley 82 at the leading end of the shaft 75 by the V-belt 83. The speed of operative rotation of the driving shaft 85 is advantageously of the order of 540 revolutions per minute. The provision of the sharpening stone 78, including portions extending through adjacent holes 31, in this embodiment ensures that at least the leading cutting edges of the blade 26 are maintained continuously in an optimumly sharp condition during the operation of the implement. The spring 64 that is preferably employed in the embodiment of FIGS. 6 and 7 of the drawings urges the rotary blade 26 resiliently against the fixed or counter blade 29 and thus against the sharpening stone 78.

The arrangement of the cutting mechanism 73 at the inlet, rather than at the outlet, of the tank 35 can be advantageous since it is then not so necessary that said tank should have agitating members such as the blades 65A that have been mentioned and that are illustrated in FIG. 4 of the drawings. Moreover, relatively long flexible hoses and rigid tubes/pipes can be used in association with the tank 35 with a very greatly reduced danger of clogging and blockage. As has been previously mentioned, the associated valves may also be of smaller diameter and lighter construction than is conventional for dealing with solid-containing manure mixtures.

After initially untreated slurry or other manure mixture has passed through the mechanism 73 under the action of the pressure difference between the atmosphere and the sub-atmospheric pressure pertaining in the tank 35 and has entered that tank through the hole 79 in the direction D, it is ready for use without further treatment and can, as soon as is required, be pumped to the or each injector 51 merely by closing the valve 71, opening the valve 44 and placing the valve associated with the pump 40 in the position in which the duct 42 is connected to the compression/outlet side of that pump. It will be noted that both the cutting mechanism 56 of FIG. 5 and the cutting mechanism 73 of FIGS. 6 and 7 are installed in a simple manner in the tank 35 in such a way as to allow their installation in already existing tanks so that an existing manure distributing implement can be modified to give it the greatly improved performance that is possible in accordance with the invention at considerably less expense than would be involved in purchasing a complete new implement in accordance with the invention. It is noted that, in any of the embodiments that have been described, should clogging or blockage exceptionally occur in one of the mechanisms 13, 56 or 73, it can almost always be cleared in a simple manner, without any dismantling, merely by temporarily interchanging the duct/pipe connections to the pump 5 or 40 thus temporarily reversing the direction of flow through the affected mechanism.

Although certain features of the implements that have been described and that are set forth in the accompanying drawings will be set forth in the following claims as inventive features, it is emphasized that the invention is not necessarily limited to those features and that it includes within its scope each of the parts of each embodiment that has been described or illustrated in the accompanying drawings or both, individually and in various combinations.

What we claim is:

1. An implement of the kind set forth for treating the solid constituents of a manure slurry to be distributed on or into the soil which comprises a cutting mechanism, said mechanism being at least partially enclosed by a casing of substantially right circular cylindrical configuration and comprising a cutter arranged to cooperate movably with an apertured counter blade mounted in said casing, said movable cutter extending from a fastening means therefor to a location proximate the inner surface of said casing and cooperating throughout at least a greater part of its length between said fastening means and said location with the apertures provided in said counter blade, said movable cutter being arranged to rotate about an axis substantially coincident with the axis of said casing during operation of the implement, said counter blade occupying a fixed position in said casing and being disposed downstream of said movable cutter with respect to the intended direction of flow of said slurry through said casing when the implement is in operation, said movable cutter being a blade of elongate configuration and comprising two operative portions which are located at opposite sides of its axis of rotation, each of said operative portions extending to a said location proximate the inner surface of said casing whereby said locations and said axis of rotation of said movable cutter are disposed in relative positions whereby they are interconnected by a single straight line, a locking element being arranged proximate said inner surface of said casing which functions to maintain said movable cutter at substantially a predetermined distance measured lengthwise along its axis of rotation relative to said casing, an inlet and an outlet for said slurry provided in said casing with said cutter and said counter blade arranged between said inlet and said outlet whereby all slurry passing through said casing is subjected to the operation of said cutting mechanism, distributing means for distributing said slurry producing a pressure difference between said inlet and said outlet of said casing when the implement is in operation.

2. An implement as claimed in claim 1, wherein said locking element is of annular configuration and is rigidly connected to said casing.

3. An implement as claimed in claim 2, wherein said annular locking element comprises a bent-over portion of the casing.

4. An implement of the kind set forth for treating the solid constituents such as lumps of waste fodder, hair and feathers of a manure slurry to be distributed on or into the soil, the implement comprising a cutting mechanism, said mechanism being at least partially enclosed by a casing and comprising a cutter arranged to rotate about an axis substantially coincident with the axis of said casing to cooperate movably with an apertured cutting blade mounted in said casing, said movable cutter comprising at least one operative portion extending from a fastening means therefor to a location proximate the inner surface of said casing and being provided with at least one cutting edge having a smooth substantially regularly curved configuration cooperating throughout at least for a greater part of its length with the apertures provided in said counter blade, a locking element being arranged proximate said inner surface of said casing which functions to maintain said movable cutter at substantially a predetermined distance measured lengthwise along its axis of rotation relative to said casing, an inlet and an outlet for said slurry provided in said casing with said cutter and said counter blade disposed relative to said inlet and said outlet, whereby all slurry passing through said casing is subjected to the operation of said cutting mechanism.

5. An implement as claimed in claim 4 wherein said locking element is of angular configuration and is rigidly connected to said casing.

6. An implement as claimed in claim 4 wherein said angular locking element comprises a bent-over portion of said casing.

7. An implement of the kind set forth for treating solid constituents such as lumps of waste fodder, hair and feathers of a manure slurry to be distributed on or into the soil, the implement comprising a cutter mechanism, said mechanism having a rotatable cutter and a counter blade, said cutter arranged to rotate about an axis substantially coincident with the axis of said casing to cooperate movably with said counter blade, a casing enclosing said cutting mechanism, locking means being arranged proximate the inner surface of said casing which performs the function of maintaining said cutter at substantially a predetermined distance measured lengthwise along its axis of rotation relative to said casing, an inlet and an outlet for said slurry in said casing whereby said slurry is adapted to flow said casing, at least one free cutter mounted in casing spaced upstream from said rotatable cutter with respect to the intended direction of operative flow of said slurry through said cutting mechanism during operation of the implement.

8. An implement as claimed in claim 7 wherein said casing is located at least partially inside a supply container provided for said slurry.

9. An implement as claimed in claim 8 wherein said casing is arranged to meet an opening having a removable cover in said supply container.

10. An implement as claimed in claim 8 wherein a driving shaft for said cutting mechanism is located within said supply container.

11. An implement of the kind set forth for treating the solid constituents such as lumps of waste fodder, hair and feathers of a manure slurry to be distributed on or into the soil which comprises a cutting mechanism, said mechanism being at least partially enclosed by a casing and comprising a cutter arranged to rotate about an axis substantially coincident with the axis of said casing to cooperate movably with an apertured counter blade mounted in said casing, said movable cutter being of elongate configuration comprising two operative portions located at opposite sides of said axis, each of said portions extending from a fastening means therefor to a location proximate the inner surface of said casing and comprising over substantially its full operative length a cutting edge co-operating throughout at least a greater part of its said length between said fastening means and said location with the apertures provided in said counter blade, an inlet and an outlet for said slurry provided in said casing with said cutter and said counter blade disposed relative to said inlet and said outlet whereby all slurry passing through said casing is subjected to the operation of said cutting mechanism, pumping means for transporting said slurry producing a pressure difference between said inlet and said outlet of said casing when the implement is in operation, the locations that each said portion extends proximate the inner surface of said casing and said axis of rotation of said movable cutter being disposed in relative positions whereby they are interconnectable by a single straight line, said straight line being contained in a longitudinal plane of symmetry of said movable cutter, said straight line being perpendicular to said axis of rotation of said movable cutter, each said location of said movable cutter portion comprising a tip-like extremity, said movable cutter portion being provided with curved edges on each side thereof with the distance between said edges increasing as the distance from said axis of rotation of said movable cutter decreases, at least one of said edges comprising said cutting edge of said portion.

12. An implement as claimed in claim 11 wherein said fastening means includes a compression spring urging said cutter against said counter blade, said compression spring so arranged that in the event of an overload of solid constituents at said counter blade and cutter it is capable of further compression to prevent or reduce damage to said counter blade and cutter.

13. An implement as claimed in claim 11 which includes at least one pre-cutter mounted in said casing spaced upstream from said cutter with respect to the intended direction of operative flow of said slurry through said cutting mechanism during operation of the implement.

14. An implement as claimed in claim 13, wherein said pre-cutter is located in alignment with said casing inlet.

15. An implement as claimed in claim 14, wherein said pre-cutter is of similar construction to said movable cutter, said movable cutter and said pre-cutter each having longitudinal planes of symmetry which intersect substantially perpendicularly to each other.

16. An implement as claimed in claim 15, wherein means for securing said pre-cutter are provided whereby it can be spaced from said movable cutter at a selected one of a plurality of different distances within said casing.

17. An implement as claimed in claim 14, wherein said pre-cutter is of similar construction to said movable cutter, means being provided whereby the angle between said longitudinal planes of symmetry of said movable cutter and said pre-cutter can be adjusted.

18. An implement as claimed in claim 11, wherein each said cutting edge is of smooth substantially regularly curved configuration.

19. An implement as claimed in claim 18, wherein each said movable cutter portion is provided with two said cutting edges which are located symmetrically at opposite sides of a longitudinal plane of symmetry of said movable cutter portion.

20. An implement as claimed in claim 19, wherein said movable cutter is of eliptical configuration and is arranged with its geometric center in substantially coinciding relationship with its said axis of rotation.

21. An implement as claimed in claim 20, wherein said movable cutter has a maximum length of substantially forty centimeters.

22. An implement of the kind set forth for treating the solid constituents such as lumps of waste fodder, hair and feathers of a manure slurry to be distributed on or into the soil which comprises a cutting mechanism, said mechanism being at least partially enclosed by a casing and comprising a cutter arranged to rotate about an axis substantially coincident with the axis of said casing to cooperate movably with an apertured counter blade mounted in said casing, said movable cutter being of elongate configuration comprising two operative portions located at opposite sides of said axis, each of said portions extending from a fastening means therefor to a location proximate the inner surface of said casing and comprising over substantially its full operative length a cutting edge co-operating throughout at least a greater part of its said length between said fastening means and said location with the apertures provided in said counter blade, an inlet and an outlet for said slurry provided in said casing with said cutter and said counter blade disposed relative to said inlet and said outlet whereby all slurry passing through said casing is subjected to the operation of said cutting mechanism, pumping means for transporting said slurry producing a pressure difference between said inlet and said outlet of said casing when the implement is in operation, the locations that each said portion extends proximate the inner surface of said casing and said axis of rotation of said movable cutter being disposed in relative positions whereby they are interconnectable by a single straight line, said straight line being contained in a longitudinal plane of symmetry of said movable cutter, said movable cutter cooperating with sharpening means mounted in said casing whereby it is self-sharpening.

23. An implement of the kind set forth for treating the solid constituents such as lumps of waste fodder, hair and feathers of a manure slurry to be distributed on or into the soil which comprises a cutting mechanism, said mechanism being at least partially enclosed by a casing and comprising a cutter arranged to rotate about an axis substantially coincident with the axis of said casing to cooperate movably with an apertured counter blade mounted in said casing, said movable cutter being of elongate configuration comprising two operative portions located at opposite sides of said axis, each of said portions extending from a fastening means therefor to a location proximate the inner surface of said casing, said movable cutter being provided with curved edges co-operating throughout at least a greater part of its length between said fastening means and said location with the apertures provided in said counter blade, on each side thereof the distance between said edges increasing as the distance from said axis decreases, at least one of said edges comprising a cutting edge, an inlet and an outlet for said slurry provided in said casing with said cutter and said counter blade disposed relative to said inlet and said outlet whereby all slurry passing through said casing is subjected to the operation of said cutting mechanism, pumping means for transporting said slurry producing a pressure difference between said inlet and said outlet of said casing when the implement is in operation.

24. An implement of the kind set forth for treating the solid constituents such as lumps of waste fodder, hair and feathers of a manure slurry to be distributed on or into the soil which comprises a cutting mechanism, said mechanism being at least partially enclosed by a casing and comprising a cutter arranged to rotate about an axis substantially coincident with the axis of said casing to cooperate movably with an apertured counter blade mounted in said casing, said movable cutter being of elongate configuration comprising two operative portions located at opposite sides of said axis, each of said portions extending from a fastening means therefor to a location proximate the inner surface of said casing, said cutter being provided with cutting edges of smooth substantially regularly curved configuration, said cutting edges co-operating throughout at least a greater part of said cutter's length between said fastening means and said location with the apertures provided in said counter blade, the edges of said cutter, including said cutting edges, on each side of said axis having the distance between them increasing as the distance from said axis decreases, an inlet and an outlet for said slurry provided in said casing with said cutter and said counter blade disposed relative to said inlet and said outlet whereby all slurry passing through said casing is subjected to the operation of said cutting mechanism, pumping means for transporting said slurry producing a pressure difference between said inlet and said outlet of said casing when the implement is in operation.

25. An implement of the kind set forth for treating the solid constituents such as lumps of waste fodder, hair and feathers of a manure slurry to be distributed on or into the soil which comprises a casing enclosing a cutting mechanism, said mechanism including a cutter and a counter blade, said cutter arranged to cooperate movably with said counter blade, said cutter being of elongate configuration comprising only two outwardly extending operative portions located at opposite sides of said axis, each of said portions extending from a fastening means therefor to a location proximate the inner surface of said casing, said cutter being provided with curved edges, on each side thereof, the distance between said edges increasing as the distance from said axis decreases, an inlet and outlet for said slurry in said casing whereby said slurry is adapted to flow through said casing, at least one pre-cutter mounted in said casing spaced upstream from said movable cutter with respect to the intended direction of operative flow of said slurry through said cutting mechanism during operation of the implement.

26. An implement of the kind set forth for treating the solid constituents such as waste fodder, hair and feathers of a manure slurry to be distributed on or into the soil, the implement comprising a casing through which said slurry is caused to flow, a cutting mechanism mounted to be at least partly enclosed within said casing, said cutting mechanism comprising a cutter and a counter blade closely adjacent thereto, said counter blade defining a plurality of apertures for receiving said slurry flow, said cutter being arranged to rotate relative to said counter blade about an axis of rotation, said cutter being elongate and having opposing cutting edges extending outwardly on each side thereof substantially coinciding for their length with an ellipse, the length of each said cutting edge being equal to at least one-half of the length of said cutter and being located at least along the forward moving portion of said cutter with respect to said counter blade, said apertures in said counter blade surrounding said axis of rotation and being substantially equidistant therefrom, the distance along the width of said cutter from said axis of rotation to said cutting edge being substantially the same as the distance from said axis of rotation to the part of each said aperture nearest thereto whereby when said cutting edge is rotated it successively defines a tangent to said nearest part of each said aperture, the distance along the length of said cutter measured from said axis of rotation to the most outwardly extending said cutting edges being at least as great as the further part of each said aperture where farthest from said axis of rotation, whereby said cutting edge is rotated successively to cover each said farthest part of said apertures, and whereby said cutting edges each performs a slicing action relative to each said aperture from the nearest to the farthest parts thereof relative to said axis of rotation.

27. An implement as claimed in claim 26 comprising a second plurality of apertures surrounding said first-mentioned plurality of apertures wherein the length of said cutter measured from said axis of rotation to the most outward of said cutting edges is at least as great as the farthest edge said aperture in said second plurality of apertures, the relationship of said cutting edges to said second plurality of apertures being such that said cutting edges perform a slicing action relative to each said aperture of said second plurality of apertures which takes place in a shorter distance along said cutting edge than with the slicing action which takes place relative to said first-mentioned plurality of apertures.

* * * * *